United States Patent [19]
Barnes

[11] Patent Number: 5,711,574
[45] Date of Patent: Jan. 27, 1998

[54] AIR BAG-EQUIPPED CHILD'S VEHICLE SEAT AND ALARM/ARMING SYSTEM THEREFORE

[75] Inventor: F. Michael Barnes, Dunnellon, Fla.

[73] Assignee: New Lenox Industries, Inc., Dunnellon, Fla.

[21] Appl. No.: 566,566

[22] Filed: Nov. 28, 1995

Related U.S. Application Data

[63] Continuation of Ser. No. 276,179, Jul. 15, 1994, which is a continuation-in-part of Ser. No. 92,725, Jul. 16, 1993, abandoned.

[51] Int. Cl.$^6$ .................................................. B60N 2/42
[52] U.S. Cl. ........................... 297/216.11; 297/250.1; 297/217.4; 340/457.1
[58] Field of Search ................... 340/457, 457.1, 340/686; 180/286; 297/276, 217.4

[56] References Cited

U.S. PATENT DOCUMENTS

| | | |
|---|---|---|
| 3,514,124 | 5/1970 | Richardson . |
| 3,753,576 | 8/1973 | Gorman . |
| 3,772,644 | 11/1973 | Hanselmann et al. ............ 340/457.1 X |
| 3,879,057 | 4/1975 | Granig . |
| 3,917,023 | 11/1975 | DeRosa . |
| 3,975,037 | 8/1976 | Hontschik et al. . |
| 4,265,468 | 5/1981 | Suszko et al. . |
| 4,268,065 | 5/1981 | Granig . |
| 4,311,339 | 1/1982 | Heath . |
| 4,345,791 | 8/1982 | Bryans et al. . |
| 4,381,829 | 5/1983 | Montaron . |
| 4,561,675 | 12/1985 | Adams et al. . |
| 4,834,420 | 5/1989 | Sankrithi et al. . |
| 4,896,894 | 1/1990 | Singletary ............................. 340/686 X |
| 4,987,403 | 1/1991 | Apfel ..................................... 340/457 |
| 5,100,169 | 3/1992 | Goor et al. . |
| 5,161,820 | 11/1992 | Vollmer . |
| 5,184,844 | 2/1993 | Goor . |
| 5,251,931 | 10/1993 | Senchena et al. . |
| 5,260,684 | 11/1993 | Mitzmaker ......................... 340/457.1 |
| 5,463,369 | 10/1995 | Lamping ............................ 340/457 X |

FOREIGN PATENT DOCUMENTS

| | | |
|---|---|---|
| 5235373 | 4/1993 | Germany . |
| 2260780 | 4/1993 | United Kingdom . |

*Primary Examiner*—Laurie K. Cranmer
*Attorney, Agent, or Firm*—Harness, Dickey & Pierce

[57] ABSTRACT

A child's seat for use in motor vehicles, including an air bag and activation circuitry. Sensors on the seat emit a first signal confirming that the air bag is armed and that the seat belt is properly connected. A second warning signal is produced when the child's seat air bag is not properly functioning or if the child's seat is not properly held in place by the vehicle's seat belt system. Also disclosed is an air bag inflator including a pressure tank, a frangible membrane for sealing gas under pressure within the tank, and a pyrotechnic squib for rupturing the frangible membrane to deploy the air bag.

20 Claims, 11 Drawing Sheets

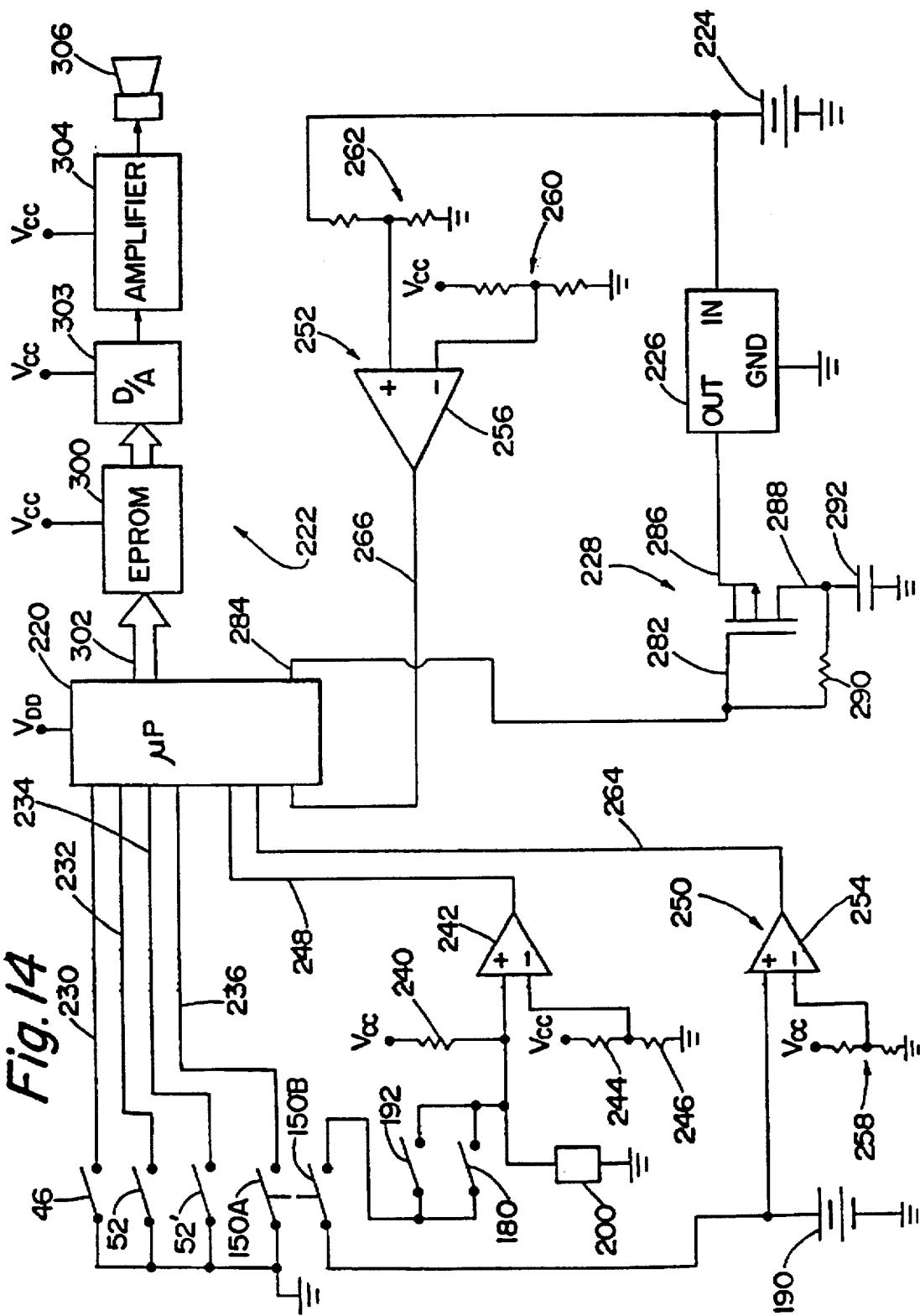

AIR BAG-EQUIPPED CHILD'S VEHICLE SEAT AND ALARM/ARMING SYSTEM THEREFORE

CROSS-REFERENCE TO RELATED APPLICATION

This is a continuation of application Ser. No. 08/276,179, filed Jul. 15, 1994 which is a continuation-in-part of application of Ser. No. 08/092,725, filed Jul. 16, 1993 now abd.

BACKGROUND OF THE INVENTION

1. Field of the Invention

This invention relates generally to the field of infant and child safety seating for motor vehicles and, more particularly, to such seating which is equipped with an alarm and/or air bag system for delivering a notification signal that the seat is properly installed and further, that the air bag is functional. The invention further relates to an air bag inflator which does not generate heat, toxic gas or residue during air bag deployment.

2. Detailed Description of the Related Art

The value of child car seats in saving lives has been proven to the degree that it has now been mandated, through legislation, that all children under the age of three years must be restrained in a child's seat while the vehicle is in motion.

Virtually all child's car seats are secured to the vehicle by employing the adult seat belts (lap belts) which are fastened around the child's car seat and are buckled.

Unfortunately, even with the use of child's car seats, thousands of children are injured or killed annually because the car seat is improperly installed. For example, when parents remove the car seat to clean the vehicle, or transfer the car seat to another vehicle, it is possible that the parent will forget to refasten the seat belt. In addition, it is possible, even when the belt end is inserted into the buckle, that a secure locking connection therebetween may not have been made. Another possible failure in the seat belt securing system lies in the accidental separation of the buckle from the belt. This can occur as the result of shifting cargo or a passenger bumping into the buckle, or a child playing with the buckle.

Child's car seats have been proposed that include an air bag in order to further protect the child from injury in event of a serious collision. One air bag equipped car seat is disclosed in U.S. Pat. No. 4,834,420 to Sankrithi et al. While such seat affords potentially enhanced protection, no provision is made for ensuring that the air bag is armed and is operating properly. Specifically, the apparatus taught by Sankrithi et al requires that a computer be operable in order for the device to function properly. Electrical power must, therefore, be supplied to the computer and whether supplied by battery or directly from the vehicle's power supply, the lack of power will render an otherwise beneficial safety system ineffective.

An important element of an air bag system is a gas generator or inflator. Current air bag inflators employ pyrotechnic technology (sodium azide/potassium nitrate), which is ill-suited for a vehicular child safety and restraint system for several reasons. In particular, heat produced by the combustion of gas-generating propellant materials is excessive. Moreover, due to uncontrollable variables in propellant loading, such as mixture ratio, aging, moisture content, and uneven burning, a dynamically filled air bag system is required. Thus, a dynamic air bag has vents which emit jets of scalding hot gases during deployment. Still further, sodium azide, conventionally used in the propellant for pyrotechnic inflators, is extremely toxic to humans and animals. It will be appreciated that, in a child safety restraint system, the relatively close proximity of the child to the gas generator greatly enhances all of these concerns.

Further, sodium azide is extremely flammable and toxic, and must be handled in a clean room environment under carefully controlled conditions. Such increases the manufacturing costs. Moreover, recently the life expectancy of sodium azide inflators has been questioned.

It would, therefore, be a substantial advance in the art to provide a child's car seat that includes an alarm for indicating improper installation of the seat, particularly with respect to the seat to vehicle connection and the arming of the air bag.

It would further be an advance in the art to provide an improved inflator for an air bag, particularly for use in a vehicular child safety and restraint system.

It is, therefore, an object of the present invention to provide an improved child's car seat.

Another object off the present invention is to provide an improved child's safety car seat of enhanced safety character.

Yet another object of the present invention is to provide a child's car seat having improved reliability.

A still further object of the present invention is to provide a child's car seat including an alarm for indicating the improper installation thereof.

A still further object of the present invention is to provide a child's car seat that indicates that the child's car seat air bag is armed.

It is yet another object of the invention to provide an improved air bag inflator, particularly for a vehicular child safety and restraint system, which eliminates any burn hazard or toxic material hazard, and which has long term reliability.

Other objects and advantages will be more fully apparent from the ensuing disclosure and appended claims.

SUMMARY OF THE INVENTION

The foregoing objects of the present invention are accomplished by providing a child's seat of a type adapted to be attached to a vehicle seat (such as a motor vehicle, air craft, or boat) by fastening the vehicle's seat belt system thereto. The child's seat of the present invention features an inflatable air bag system which is stored in a collapsed state within the child's seat means and is selectively rapidly expandable in order to protect a child seated in the child's seat from injury upon sudden deceleration of the vehicle. The air bag system is armed via a sensor mounted to the child seat. The sensor is positioned in sensing relation to a child positioned in the child's seat such that the air bag is armed when a child is positioned therewithin and is disarmed when the child is removed therefrom. The child's seat also includes a second sensor for indicating the status of the seat belt holding the child's seat in place on the vehicle seat. The second sensor is positioned in operative association with the seat belt system and senses whether the seat belt system is in locking engagement or not. A first signal is emitted when the seat belt system is in locking engagement and a second warning signal is emitted when the seat belt system is in an unlocked (disengaged) state.

In another form, the invention provides a vehicular child safety and restraint system including a seat structure, an air bag system including an inflatable air bag and an inflator, a child restraining harness, a harness switch activated when the child is secured within the harness, and a connection for arming the air bag system when the harness switch is activated and for disarming the air bag system when the harness switch is deactivated. There is further provided a buttocks switch positioned within the seat structure so as to be activated upon proper positioning of a child within the seat structure, and a device for issuing a warning indicating that the child is escaping when the harness switch is activated and the buttocks switch is deactivated. At least one seat belt sensing switch is in operative association with the seat structure and the seat belt system of a vehicular seat belt system fastened to the child safety and restraint system, the seat belt sensing switch being activated when the seat belt system is in locking engagement. A device is provided for issuing a warning indicating that the seat belt system is not in locking engagement when the harness switch is activated and the seat belt sensing switch is deactivated. Further, a device is provided for emitting a status signal indicating that the child is safe when the harness switch, the buttocks switch and the seat belt sensing switch are all activated.

Another aspect of the invention is the provision of an inflator for the air bag, the inflator including a pressure tank having an outlet connected to the inflatable air bag and containing gas under pressure. At least one frangible membrane is arranged for sealing the gas under pressure within the tank, and a controllable device, such as a pyrotechnic device, is positioned for rupturing the frangible membrane for inflating the inflatable air bag by allowing gas under pressure to flow from the tank into the air bag. Preferably there are a pair of frangible membranes spaced from each other and arranged in series for sealing the gas under pressure within the tank. The pyrotechnic device is positioned between the frangible membranes, rendering the pyrotechnic device essentially inaccessible to inhibit tampering.

The air bag system is contained within an enclosure having a door which opens when the inflatable air bag inflates and which defines an opening through which the inflatable air bag projects in a deployed position. An acceleration sensor is connected to the air bag system for activating the air bag system upon the sensing of acceleration forces indicative of a collision. In addition, to discourage tampering there is an anti-tamper safety switch connected to the door and to the air bag system for activating the air bag system upon the opening of the door, thereby making it readily apparent when a person has attempted to tamper with the air bag system.

BRIEF DESCRIPTION OF THE DRAWINGS

FIG. 14 is an electrical schematic diagram of circuitry included within the seat structure of FIGS. 9 and 10.

DETAILED DESCRIPTION OF THE INVENTION AND ILLUSTRATIVE EMBODIMENTS THEREOF

While the present invention will be described more fully hereinafter with reference to the accompanying drawings, in which particular embodiments are shown, it is to be understood at the outset that persons skilled in the art may modify the invention herein described while still achieving the functions and results of this invention. Accordingly, the description which follows is to be understood as illustrative and exemplary of specific structures, aspects and features within the broad scope of the present invention and not as limiting of such broad scope of the present invention.

Figure 1:
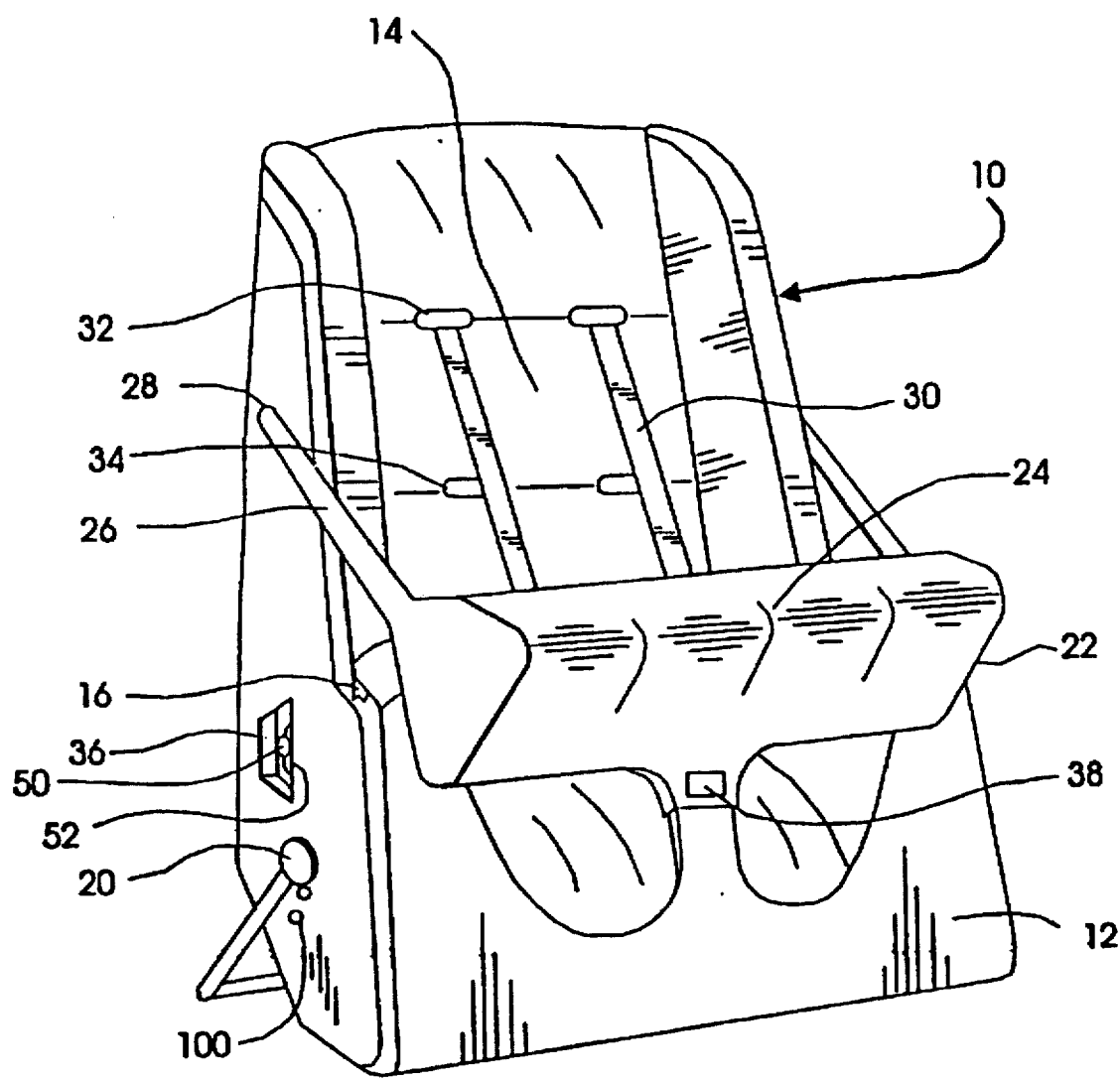
FIG. 1 is a perspective view of a child's car seat according to one embodiment of the present invention.
Figure 2:
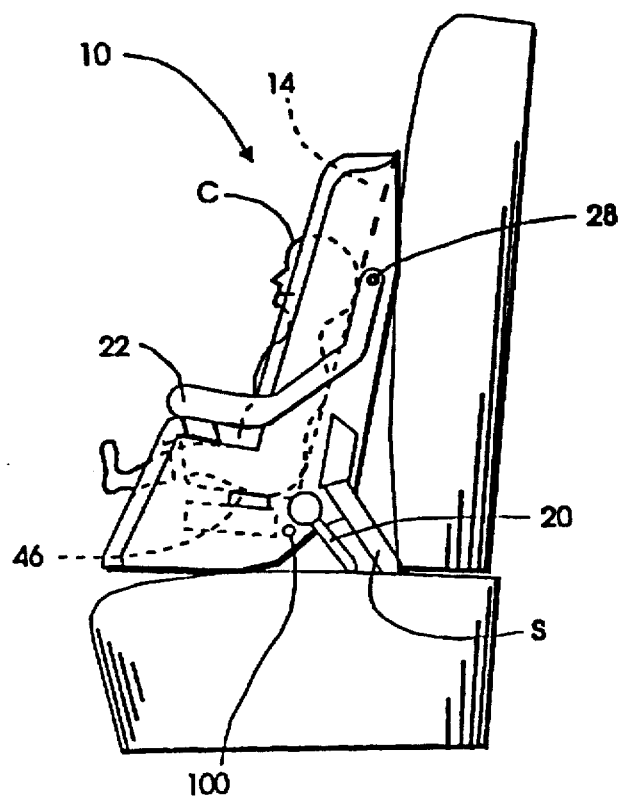
FIG. 2 is a side view of a child's car seat according to one embodiment of the invention, as installed in a motor vehicle.
Figure 3:
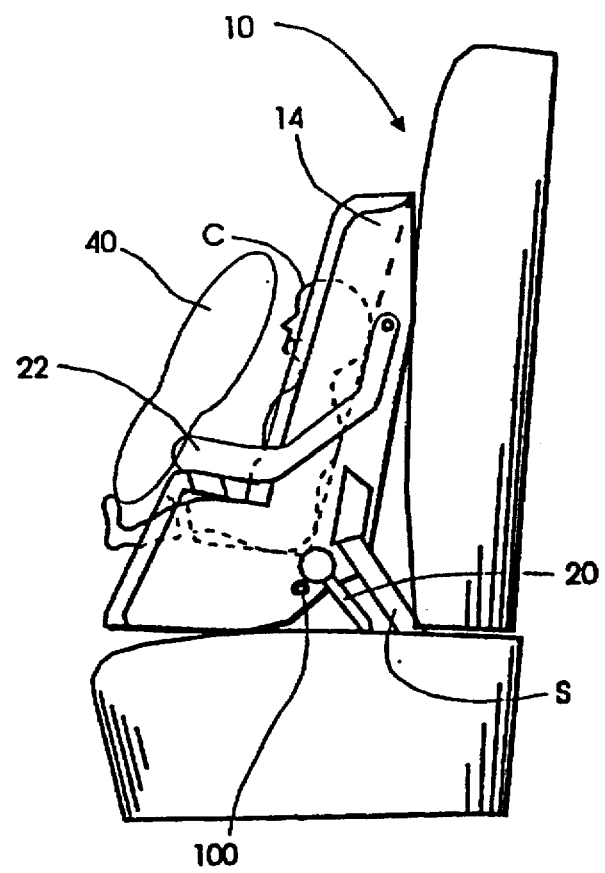
FIG. 3 is a side view of a child's car seat according to one embodiment of the present invention, as installed in a motor vehicle and showing the air bag inflated.

Referring now to the drawings and particularly to FIGS. 1 through 3, a child safety and restraint system in the form of a child's car seat generally indicated at 10 is therein illustrated. The car seat comprises a child seating means or seat structure such as a molded plastic shell 12 having a cavity 14 generally in a shape so as to comfortably allow a child C to be seated therein. A padded liner 16 is positioned within the cavity and provides a comfortable surface for the child to rest on. The liner 16 is usually detachably fastened to the shell 12 via mechanical fastening means such as a combination of straps, hook and loop fasteners, and snaps (not shown). Located near the lower portion of the car seat 10 is a bar 20 that is used to adjust the angle of the child's car seat relative to the angle of the vehicle seat to which it is connected in order that the child C is essentially forward facing in a comfortable position. A swing down shield 22 comprises a padded central portion 24 and a pair of opposing outwardly extending arms 26 which are hingedly secured at 28 to the main portion of the shell 12. The swing down shield 22 is adapted to swing from a substantially vertical upwardly extended position that allows the child unrestricted movement (such as positioning of the child in and removal of the child from the seat 10), to a locked position wherein the swing down shield 22 is essentially forward facing. Connected to the swing down shield 22 are a pair of webbed shoulder straps 30 that further restrain the child when the swing down shield 22 is engaged. Each of the shoulder straps has one of its ends connected to the swing down shield 22 and the opposite end is inserted through one set of holes defining openings 32,34, depending on which set is appropriate for the child's size, and is connected to the rear of the seat by suitable means (not shown).

The car seat 10 is fastened to the vehicle seat by means of a seat belt system which is passed behind the seat and through slot openings 36 on opposite sides of the shell 12. The seat belt end is then inserted into the buckle so that it is locked in place. The seat belt and buckle are collectively referred to as the seat belt system S. Also provided is a locking mechanism 38 that locks the swing down shield 22 to the shell 12 in the forward facing position.

Figure 4:
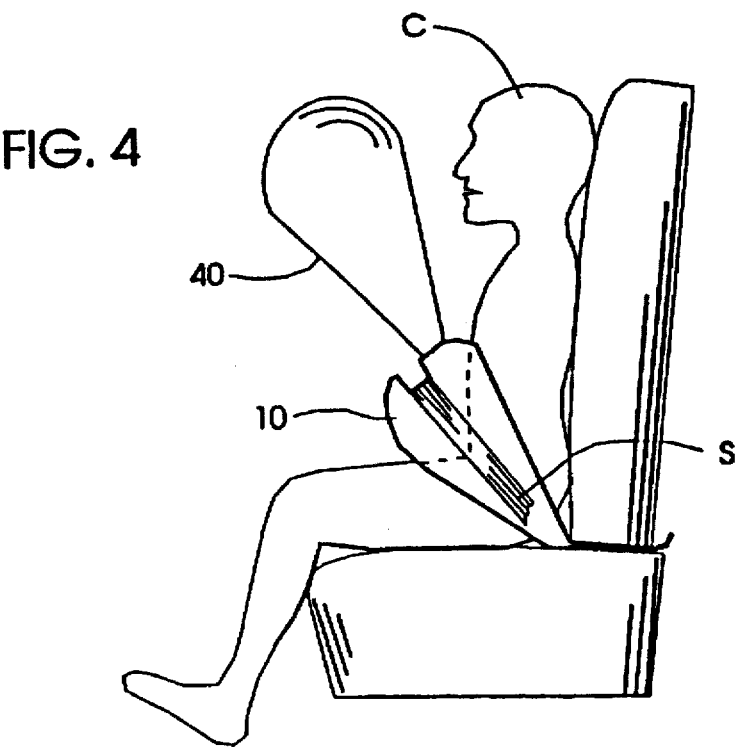
FIG. 4 is a side view of an alternative embodiment according to the present invention, of a restraining system for larger children, with the air bag inflated.
Figure 5:
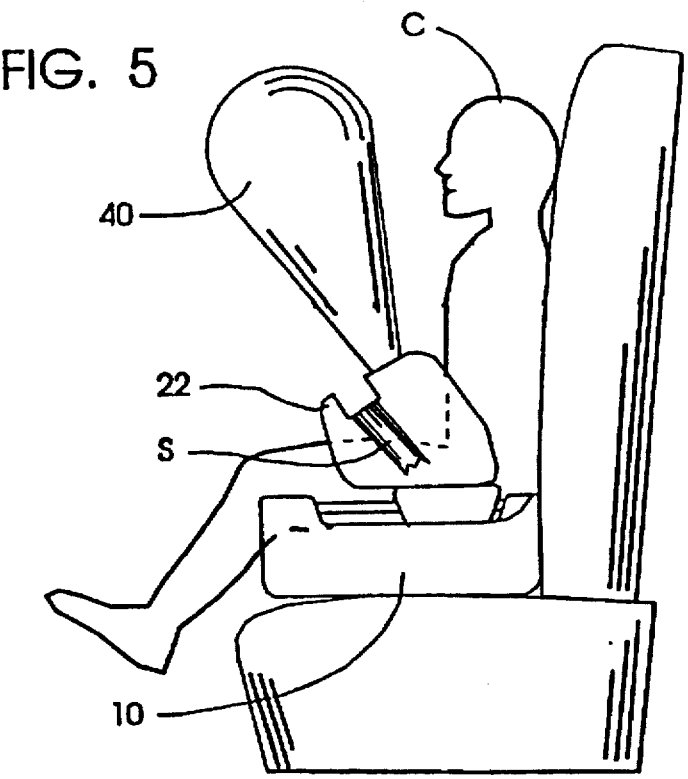
FIG. 5 is a side view of a child's booster seat installed in a vehicle with an air bag and alarm according to another embodiment of the present invention.

FIGS. 4 and 5 illustrate different types of safety seating which could be equipped with the air bag and alarm of the present invention. For example, FIG. 4 illustrates an air bag system that is incorporated into a swing shield restraining system and FIG. 5 illustrates an air bag system incorporated into a child's booster seat. In the description that follows reference will be specifically made to the child's seat of FIGS. 1–3. However, the reader will appreciate that the system described could be readily applied to the child's seat of FIGS. 4 and 5, as well as others not herein illustrated.

Figure 7:
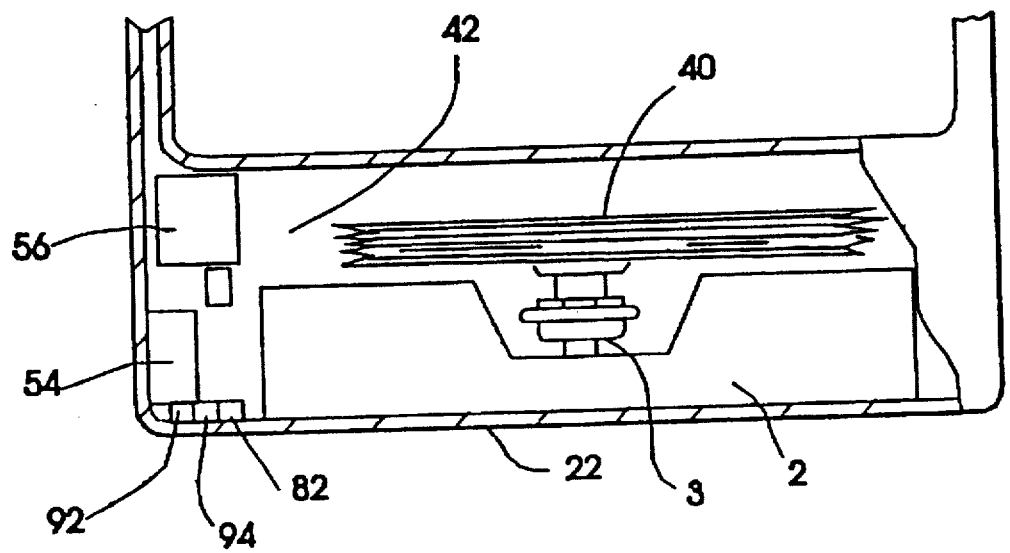
FIG. 7 is a broken away plan view of the swing-down arm of a child's car seat according to one embodiment of the present invention, showing the air bag and alarm systems installed therein.

FIG. 7 illustrates a broken away plan view of the swing down shield 22 of the car seat. The inflatable air bag means or air bag 40 and associated circuitry and sensors may also be stored therein and are schematically indicated at 42.

Air bag systems such as would be adapted for use in the present invention include an expandable air bag having a shuttle valve connected thereto. A tank 2 of pressurized gas (e.g., compressed air at a pressure of 150 psi) or any one of the well known chemical gas generating systems is connected to the shuttle valve 3. A solenoid valve is connected to the gas generator and is activated by sensing means such as an inertial switch, or, more preferably, an accelerometer, which is powered by the vehicle power source or, more preferably a battery within the seat housing. A detailed explanation of the air bag system is not deemed necessary because the technology is well developed for use in automobiles and is easily adapted for use in connection with the present invention, within the skill of the relevant art.

The air bag 40 is stored in a collapsed state (as shown in FIG. 7) within the child seating means and particularly within the swing down bar 22. The air bag 40 is adapted to expand in order to protect from injury a child C seated (or otherwise positioned) within the child's seat upon sudden deceleration of the vehicle, such as occurs during a collision.

Figure 6:
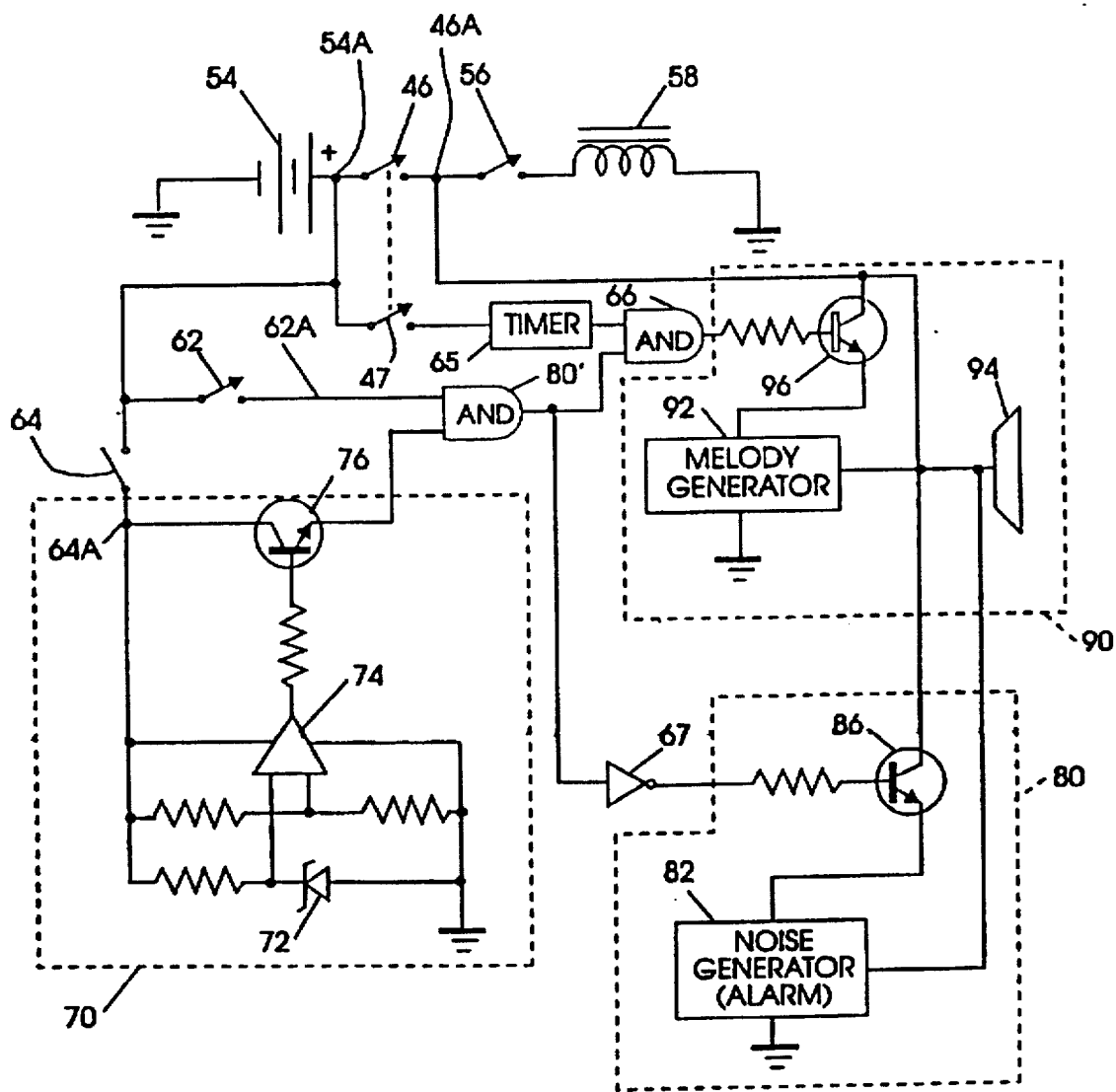
FIG. 6 is an electrical schematic diagram of an alarm and air bag arming system in accordance with a preferred embodiment of the present invention.

The child's seat 10 includes an air bag arming system for arming the air bag 40 mounted to the child's seating means and positioned in sensing relation to the child C positioned therewithin. The air bag 40 is armed when the child C is positioned in the child seating means or shell 12 and is disarmed when the child is removed therefrom. The air bag arming system is activatable by positioning the child in the shell 12. In the preferred embodiment, the system for arming the air bag 40 comprises a switch means or switch 46 (see the schematic circuit diagram of FIG. 6) that is mounted in the shell 12 so that the switch is open when the shell is vacant and is closed by the weight of the child C being placed therein. In the illustrated embodiment, the switch 46 is located in the lower portion of the shell 12 and is closed when the child's bottom contacts the shell. The foregoing is a preferred location for the switch due to the fact that it will remain closed should the child lean forward.

Turning now to another aspect of the invention, child's safety seats are virtually useless when not properly installed within the vehicle, i.e., the seat belt system S must be connected so that the belt and the buckle are in locking engagement in order to assure that the child's seat 10 is held in place in the event of a collision. Thus, the present invention includes a seat belt sensing means 50 for sensing that the seat belt system is properly engaged or locked. The seat belt sensing means 50 is positioned in operative association with the child seating means or seat structure 10. In the preferred embodiment the seat belt sensing means 50 includes a second switch means or switch 52 that is connected to the shell 12 such that the seat belt system S is in contacting relation therewith. When the seat belt system S exerts a pressure on the switch 52 sufficient to close or activate the switch 52, the seat belt system S is in locking engagement and emits a first signal confirming proper interconnection of the seat belt and the buckle. The switch 52 is deactivated upon unlocking disengagement of the seat belt system S and a second warning signal is emitted. In the illustrated embodiment, the switch 52 is positioned within one of belt slot openings 36 such that when the belt is placed over switch 52 and is placed in tension, switch 52 is closed. The reader will note that although a switch location is suggested, it could nevertheless be located elsewhere without adversely affecting the operation of the present invention.

Referring again to FIG. 6, a DC power source 65 such as a separate battery or a battery power supply means of the vehicle itself provides electrical power to the circuit in line 54a. Switch 46 is employed to arm the air bag and has one of its contacts connected to the electrical power source at 54a and its opposite contact connected on line 46a to an inertial switch 56 that closes upon impacts greater than one-half the force of gravity (0.5 g). The inertial switch 56 may suitably comprise an Analog Devices ADXL50 accelerometer along with associated electronics circuitry as necessary to energize the solenoid valve in the event of a crash. Switch 46 is a single pole, single throw normally open momentary switch which is ganged with a normally open momentary switch 47 which travels to the off position after contact. A solenoid valve (air valve) 58 which although technically part of the air bag itself, is shown here for completeness, is connected between the opposite contact of switch 56 and ground. A timing circuit or timer 65 (e.g., comprising a 7555 or similar IC) is connected to the opposite contact of switch 47.

When switch 46 is closed, power is supplied to switch 56 and arms the air bag via the solenoid (air valve) 58. Switch 46 also triggers the timing circuit 65 via the secondary part of the switch.

The means for sensing that the seat belt system has been placed in interlocking engagement includes switch 62 which has one contact connected to line 54a and the opposite contact connected to line 62a. Switch 62 is a normally open switch which is closed when the child's car seat is cinched by the vehicle's seat belt.

Switch 64 is a pressure switch, well known to those skilled in the art, and is normally closed when the pressure required to expand the air bag is present in the propellant canister. One contact of switch 64 is connected to the first contact of switch 62 and the opposite contact is connected on line 64a. It will be noted that when a chemical gas generating system is employed, switch 64 is omitted.

A voltage detection circuit, generally indicated by the components within the box defined by dotted lines 70 serves to alert the user if adequate power is not being supplied to the system. A zener diode 72 sets a reference voltage and is connected between ground and one of the input lines of operational amplifier (741 op-amp) 74. The other input of op-amp 74 senses the actual supply voltage via line 64a. The output of op-amp 74 is connected to the base of transistor 76. The collector of transistor 76 is also connected to line 64a and the emitter is one of the inputs to AND gate 80'.

An alerter circuit, for sounding the previously mentioned alarm, is generally indicated at 80. A piezoelectric alarm buzzer 82 for emitting a second warning signal is actuated when power is supplied to the buzzer unit by the emitter of control transistor 86. If switch 62 is closed (seat belt fastened) when switch 46 is closed, and if the transistor 76 is conducting, then the logic AND gate 80' will go high (on) which in turn drives logic AND gate 66 high (on). When the output of the timer 65 goes high and AND gate 66 is high, then power is supplied to the melody generator 92 by transistor 96.

A device or means for emitting a status signal such as a melody generator circuit for playing a first confirming signal or a short tune when the air bag is armed and the seat belt is in interlocking engagement is generally indicted by the components within block 90. A commercially available melody generator 92 is connected to drive speaker 94 both of which are driven by drive transistor 96. The emitter of transistor 96 supplied the input power signal to drive melody generator 92 which in turn supplies the current necessary to drive speaker 94.

The melody generator will play until the output of the timer goes low (off). If, on the other hand, switch 62 is open, or air pressure switch 64 is open, or transistor 76 is not biased, then the AND gate 80' will be low (off) which disables gate 66.

In the event that switch 62 is open, or switch 64 is open, or transistor 76 is unbiased, the output of AND gate 80' will go low (off). When AND gate 80' output is low, the output of inverter 76 will go high, biasing transistor 86 on.

With transistor 86 biased on, power is supplied to the noise generator (alarm) 82. The signal from the noise generator 82 (alarm) is supplied to transducer 94 which transforms the signal to an audible noise.

Associated with the logic system is a voltage sensing device comprised of op-amp 74, zener diode 72 and associated resistors. If the voltage to the system falls below the selected zener diode voltage, op-amp 74 will not supply enough current to bias transistor 76, which, in turn, will disable the B input of AND gate 80' thereby causing the alarm 82 to sound.

It will be noted that the foregoing alarm and melody generator could be replaced or complimented with a visual indicator such as a light 100 (see FIGS. 1–3) for the hearing impaired.

In operation, the child's seat 10 is installed in a vehicle by inserting the seat belt through belt slot openings 36 and inserting the belt into the buckle opening ensuring that the two components are in locking engagement. The belt then is tightened, which action will close switch 62. In addition, when a child is positioned in the shell 12, switches 46 and 47 close. At this point, the circuit will either output a melody via melody generator 90 indicating that all systems are operating properly or a warning via buzzer 80 that one of the monitored conditions is in a fault mode.

Turning now to the first case, when the air bag equipped car seat is operating properly, the following conditions must exist, namely, the power to the system (battery voltage) must be adequate, the pressure in the gas canister must be adequate, the seat belt system must be in locking engagement and a child must be seated therein. If any one of the foregoing conditions is not met, then the logic circuit will activate the alarm buzzer 80 and not the melody generator 90.

A battery voltage sufficient to drive the circuit is defined by zener diode 72. The output signal op-amp 74 is proportional to the input voltage signal on line 64a and the zener diode voltage inputs thereto. A power supply voltage at or above the zener diode voltage will cause the op-amp output voltage to drive the base of transistor 76 biasing the transistor on and causing a current flow from the emitter to the collector and providing a high input at AND gate 80'. As shown on the schematic, AND gate 80', in order to have a high output signal, must simultaneously have all three of its input signals high. In addition, to adequate supply voltage to the circuit, adequate pressure in the gas canister and a connected seat belt system will allow a high input signal on line 62a and lastly a child present in the seat will close switch 46. The foregoing favorable conditions will result in a high output signal from AND gate 80' which is also one of the two input signals to AND gate 66. The placement of a child in the seat will also temporarily close switch 47 activating timer and outputting a high signal for the timed period into AND gate 66. Thus, for the period of time that the timer 65 is on the output of AND gate 66 will likewise be high driving the base of transistor 96 which activates the melody generator 92 and speaker 94 in order to play the tune which indicates that the system is properly operating.

On the other hand, should any one of the foregoing parameters not be optimal, AND gate 80' will output a low signal which is input into invertor 67 and which outputs a high signal. The output signal from invertor 67 is input into AND gate 68. Also input into AND gate 68 is the output signal from timer 69 which is high for the timed period. High input signals into AND gate 68 from invertor 67 and timer 69 cause AND gate to output a high signal driving the base of transistor 86 biasing the transistor on and supplying the current necessary to drive the piezoelectric warning buzzer 82. Corrective action may then be taken.

Figure 8:
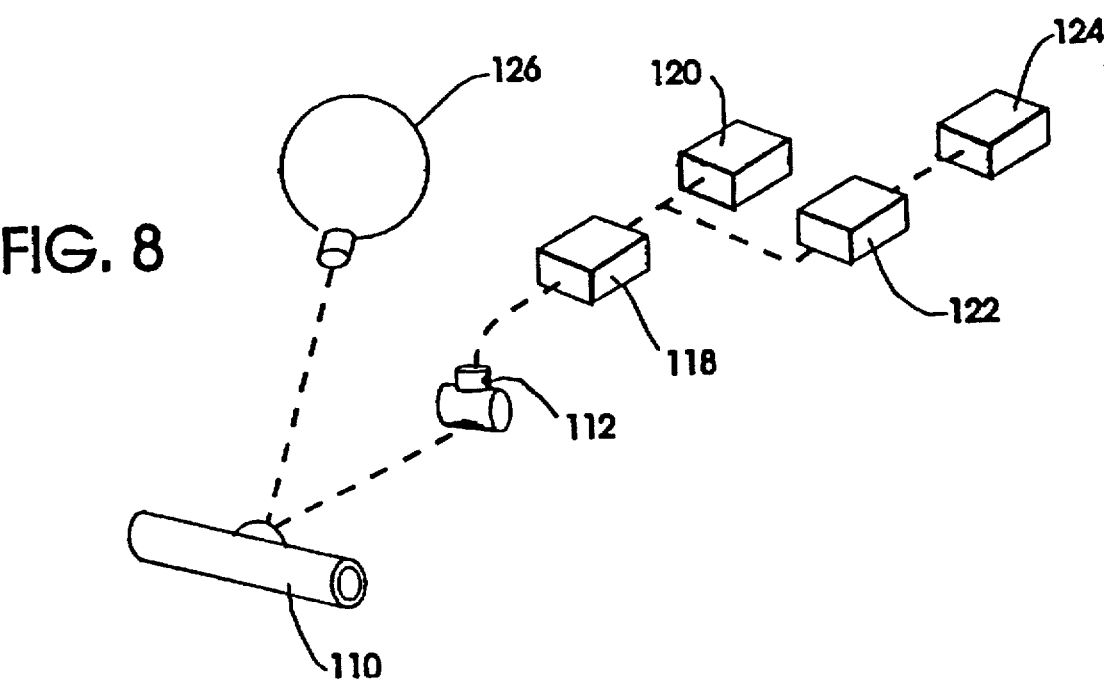
FIG. 8 is a schematic representation of a car seat/air bag system according to another aspect of the present invention.

FIG. 8 is a schematic representation of a car seat/airbag system according to another embodiment of the present invention. In this car seat/airbag system, a tank 110 of suitable gas or vapor-generating material, e.g., pressurized air, compressed gas other than air, or vapor propellant, is connected to solenoid valve 112 to control the flow of gases from tank 110.

Solenoid valve 112 is actuated by means of an inertial switch 118 which is powered by battery 120.

A switch and associated output device 122 operates to alert the user that the car seat is properly installed and in working order. The switch and output device 122 is coupled to a transducer 124, which receives control signal(s) from the switch and output device 122, so that the transducer provides suitable output, e.g., of an aural (audio) and/or visual character.

The airbag 126 is coupled with pressurizing medium tank 110 via the solenoid valve 112 as schematically shown.

In a further aspect, the vehicular seat of this invention may be modified with a weight sensor element disposed in operative sensing relationship to the weight-bearing seat surface, and coupled to alarm circuitry signal arranged to output an alarm signal if the child manages to extricate itself from the seat assembly after the child is initially seated and secured in the seat.

Figure 9:
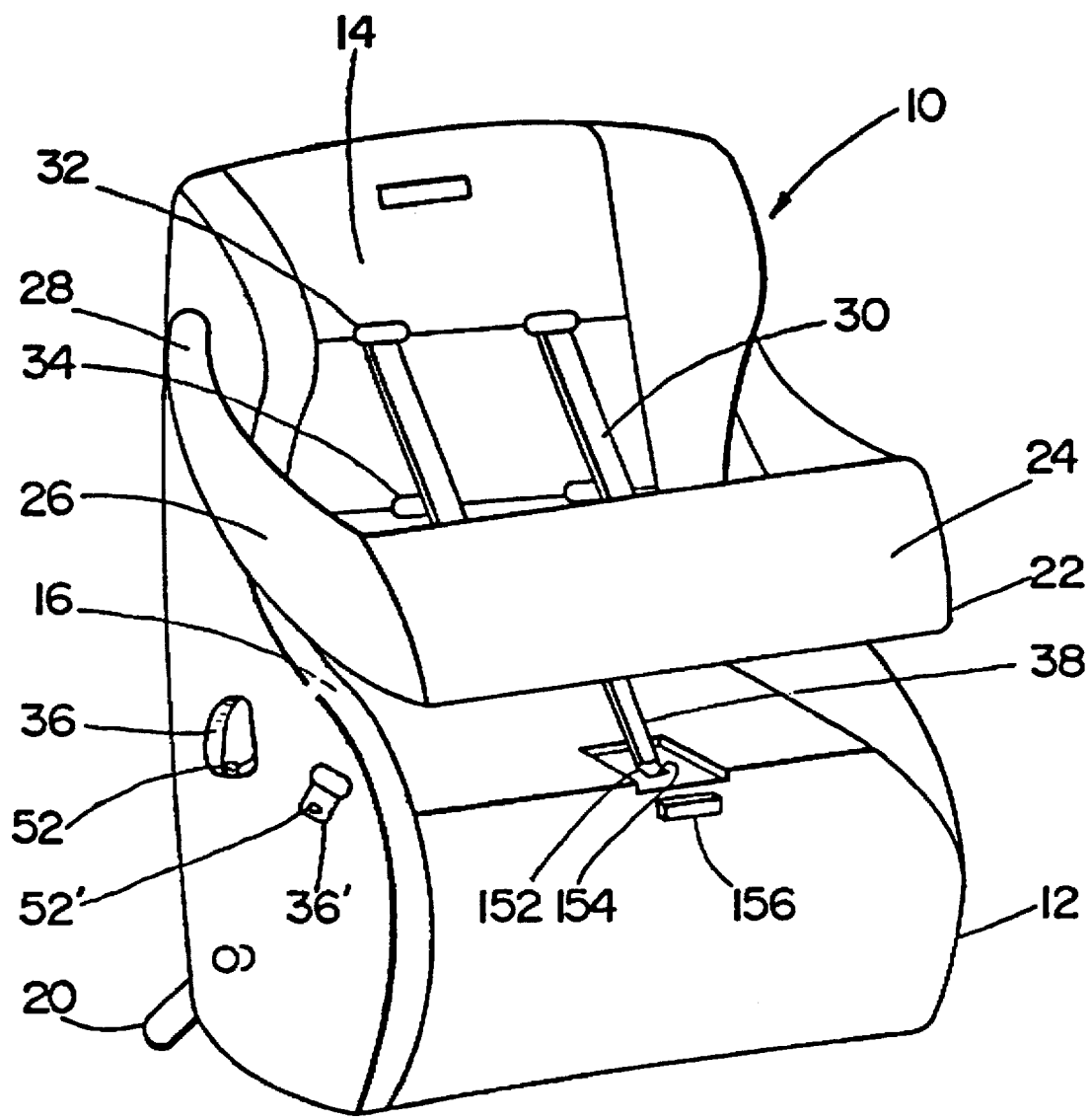
FIG. 9 is a perspective view, comparable to FIG. 1, of an alternative physical configuration of a child's car seat according to another aspect of the invention.
Figure 10:
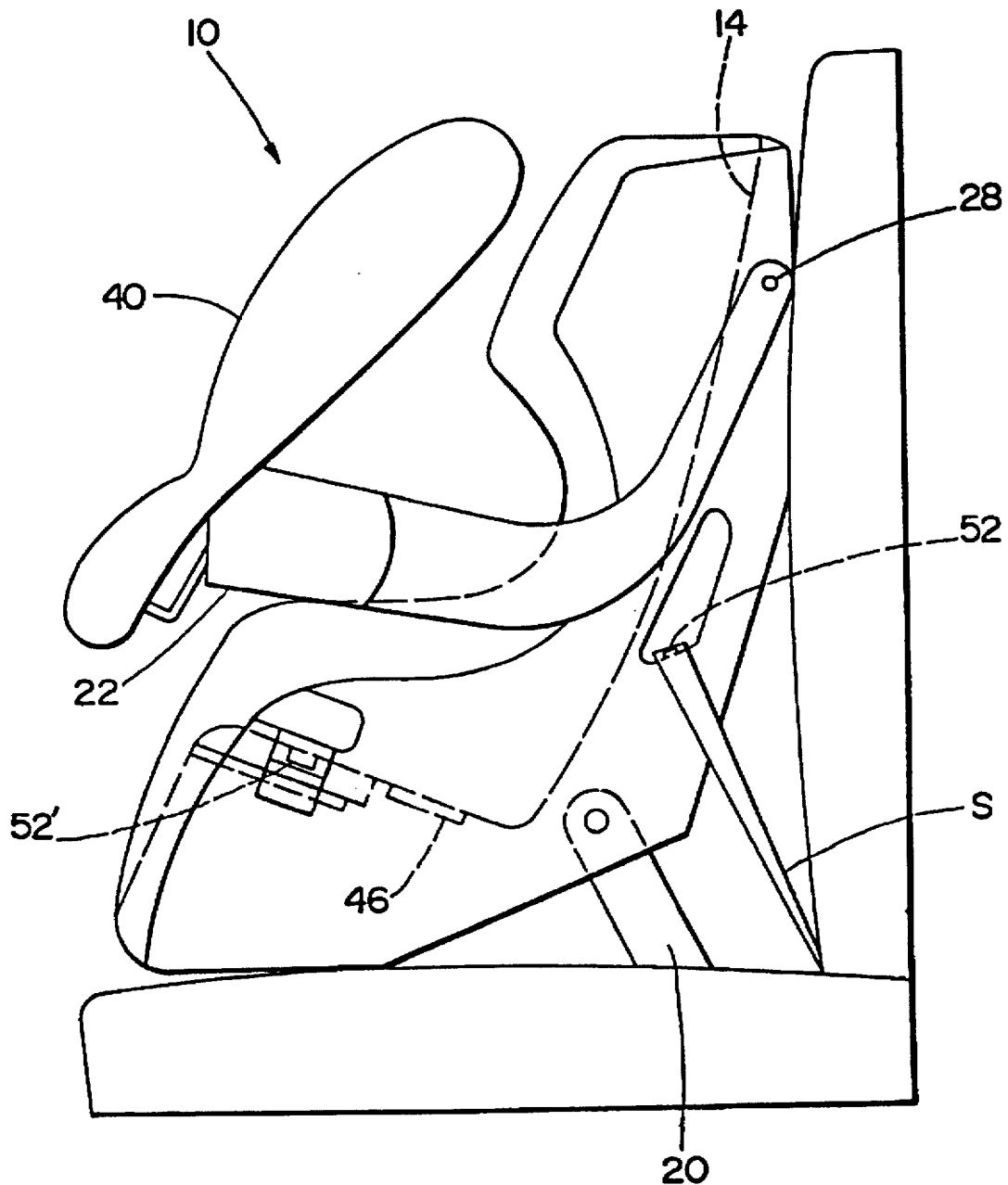
FIG. 10 is a side view of the child's car seat of FIG. 9, as installed in a motor vehicle and showing the air bag inflated or deployed.

Referring now to FIGS. 9 and 10, an alternative configuration of a vehicular child safety and restraint system is similar to that of FIGS. 1–3, but additionally includes a second pair of openings 36' and associated seat belt switches 52' for alternatively accommodating rear-facing mounting of the child safety seat in a vehicle, a restraining harness switch 150, described hereinbelow in greater detail, and an air bag inflator which employs a hermetically stored high pressure compressed inert dry gas propellant.

In overall configuration, the child safety and restraint system of FIGS. 9 and 10 is quite similar to that of FIGS. 1–3, and identical reference numerals are accordingly employed to represent identical or corresponding elements. The shell portion 12 in FIG. 9 does not have cutouts for the child's legs as in FIG. 1, but, rather, goes straight across. Correspondingly, the swing down shield 22 is spaced from the shell 12 in FIG. 9, and the locking mechanism 38 in FIG. 1 is replaced by a hold-down strap 38 in FIG. 9.

The hold-down strap 38 is also attached by securing to the shoulder straps 30 as part of a child-restraining harness, the lower end of which is connected to a harness lock plate 152. When the harness lock plate 152 is inserted into a harness lock mechanism aperture 154, the harness switch 150 is activated, as described hereinbelow in greater detail with reference to FIGS. 11A and 11B. A pushbutton 156 is provided for releasing the harness lock plate 152.

With particular reference to FIG. 10, the buttocks switch 46 is located in the lower portion of the shell 12, as in the case of the embodiment of FIGS. 1–3, and is closed when the child's bottom contacts the shell 12, thus indicating proper positioning of the child within the seat structure. However, rather than arming the air bag system as in the embodiment described hereinabove, the buttocks switch 46 in the embodiment of FIGS. 9 and 10 is employed to sense that a child is escaping or is not properly positioned, and the harness switch 150 is employed to arm the air bag system.

More particularly, the harness switch 150 is activated when the harness lock plate 152 is properly inserted into the lock mechanism aperture 154, and presumably the child is secured within the harness.

Figure 11A:
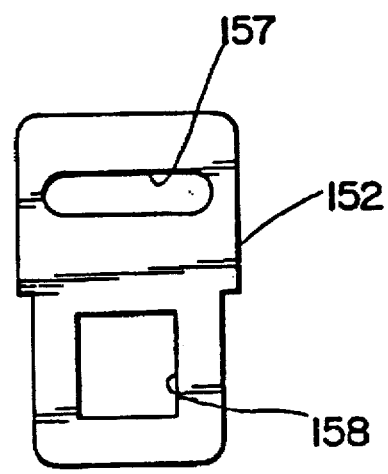
FIG. 11A depicts a harness lock plate and FIG. 11B depicts a sliding harness lock mechanism including the harness switch of the child safety seat of FIGS. 9 and 10.
Figure 11B:
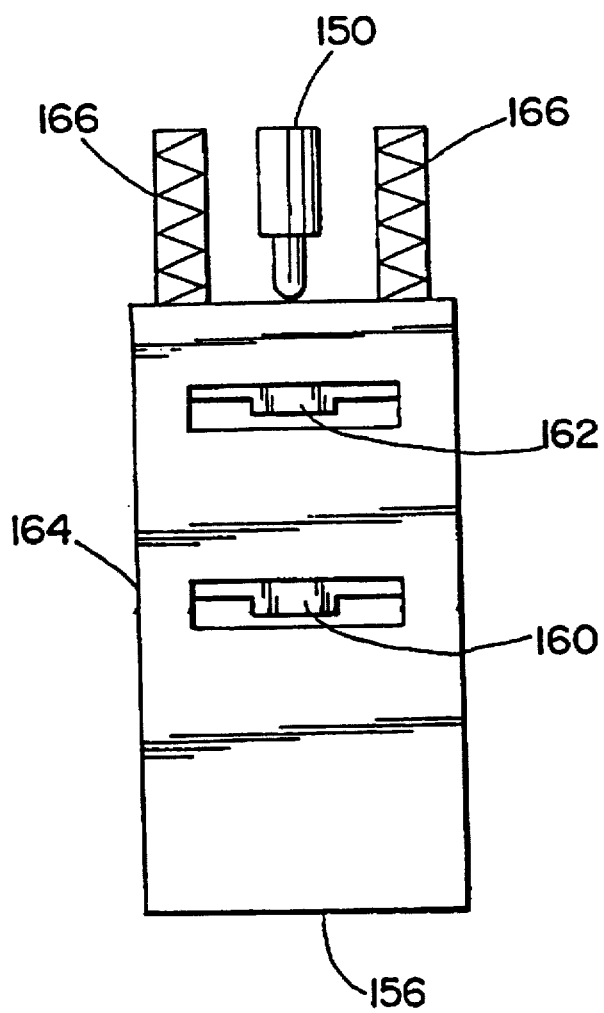

The harness lock plate 152 is shown in enlarged view in FIG. 11A, and has a narrow aperture 156 for attachment of harness webbing (not shown in FIG. 11A) and another aperture 158 which is engaged by either of a pair of inclined latch tabs 160 and 162 on a sliding harness lock and release plate 164, shown in FIG. 11B. Two latch tabs 160 and 162 are provided for alternative positioning of the harness lock plate 150 depending on the size of the child. FIG. 11B is a top view of the sliding harness lock and release plate 164, while FIG. 11A is a front elevational view of the harness lock plate 152. One end of the sliding harness lock and release plate 164 comprises the pushbutton 156 visible in FIG. 9.

A pair of springs 166 are provided for urging the sliding harness lock and release plate 164 in a forward direction (downwardly in the orientation of FIG. 11B), and the harness switch 150 is positioned so as to be activated when the sliding harness lock and release plate is moved rearwardly by insertion of the harness lock plate 152. The configuration is such that the sliding harness lock and release plate 164 reaches its full forward limit of travel to deactivate the harness switch 150 when the harness lock plate is released. It will be appreciated that suitable housing and support structure is provided for the sliding harness lock and release plate 164, omitted for clarity of illustration.

In summary, then, there are three types of switches employed in the child safety and restraint system of FIGS. 9–11. Thus, the buttocks switch 46 is used to determine whether the child is present and properly positioned in the seat. There is at least one and preferably there are two seat belt sensing switches 52 and 52' in operative association with the seat structure and the seat belt system of the vehicle, one or the other of which is activated when the seat belt system is in locking engagement with the child safety and restraint system. Finally, the harness switch 150 is activated when the child is secured within the harness.

Figure 12:
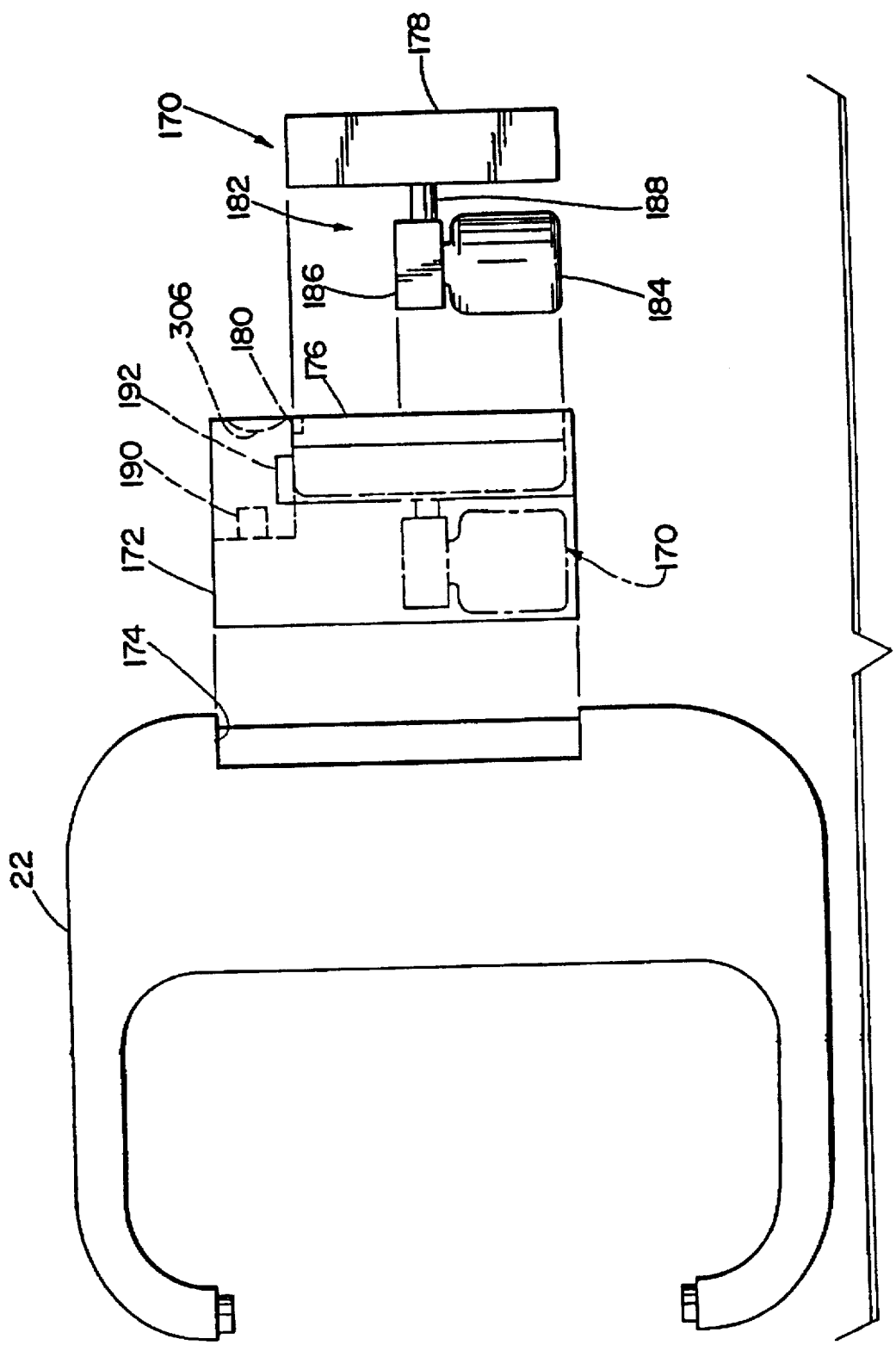
FIG. 12 is an exploded view showing the manner in which an air bag system fits into the swing down shield of the child's safety seat structure of FIGS. 9 and 10.

With reference to FIG. 12, which is an exploded view, an air bag system, generally designated 170, is located within an enclosure 172, which may be termed an encapsulation insert, comprising top and bottom plastic shells suitably "welded" together so as to resist tampering. The enclosure 172 is received within a suitable cavity 174 within the swing down shield 22. The enclosure 172 has a door 176 which opens when an air bag 178 deploys or inflates, and which accordingly defines an opening through which the inflatable air bag 178 projects in a deployed position.

In order to discourage tampering, an anti-tamper safety switch 180 is physically connected to the door 176 and is electrically connected as described hereinbelow with reference to FIG. 14 to activate the air bag system 170 in the event the door 176 is opened. This effectively prevents a system which has been tampered with from being placed in service. Appropriate warning notices are provided.

The air bag system 170, for convenience of illustration, is shown in solid lines outside the enclosure 172 in FIG. 12 and additionally is shown in dash lines in position within the enclosure 172.

More particularly, the air bag system 170 includes in addition to the air bag 178, an inflator, generally designated 182. The inflator 182 in turn more particularly comprises a pressure tank 184 connected to the air bag 178 through a manifold 186, preferably of aluminum, and a suitable interface 188, preferably of plastic.

Also included within the enclosure 172 are a lithium battery 190 for activating the air bag system 170, and an inertial sensor 192, such as an acceleration switch, for detecting life threatening front, rear and side collisions. A suitable accelerometer is manufactured by Aerodyne.

Figure 13:
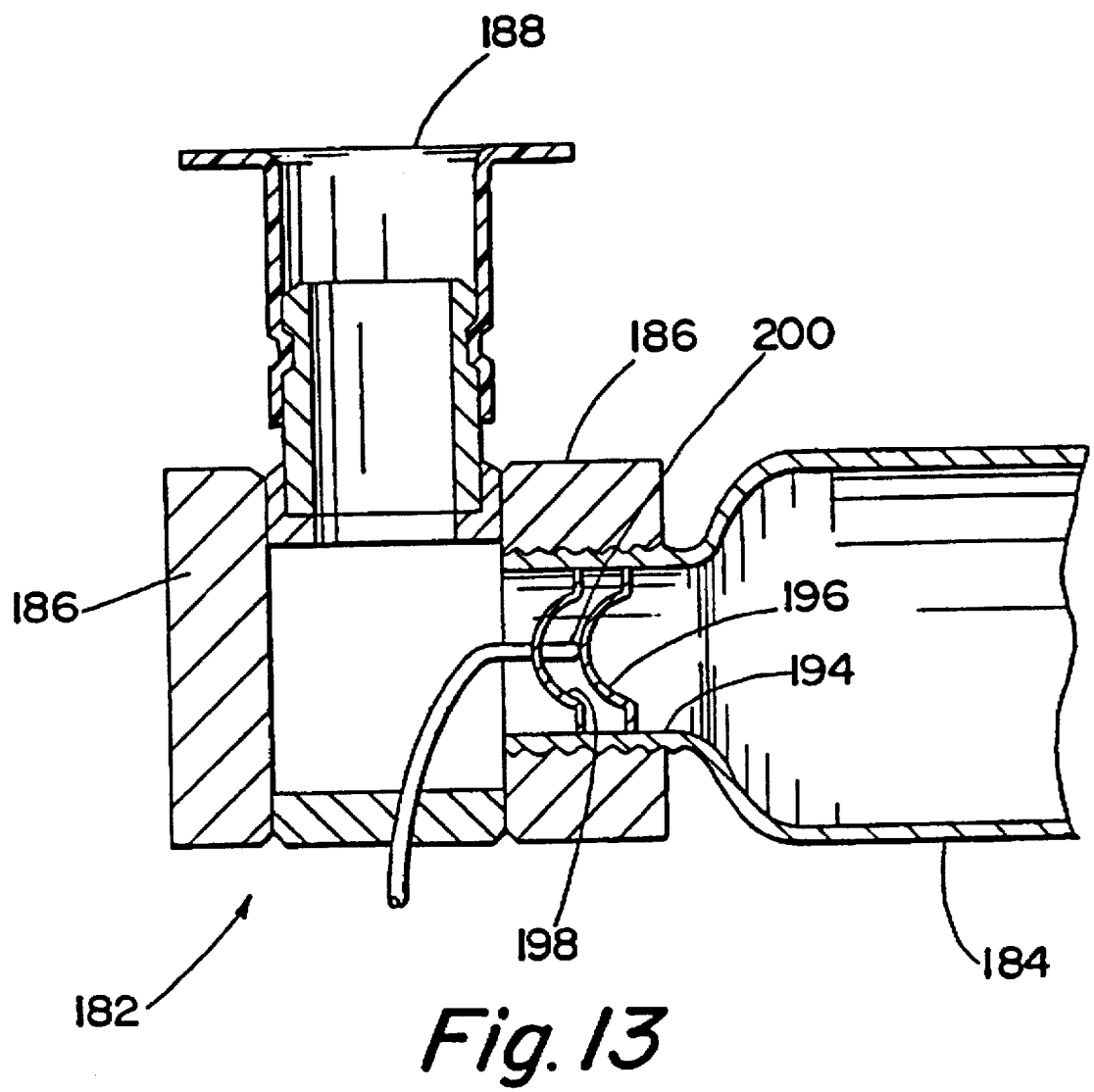
FIG. 13 is an enlarged view of a portion of the inflator included in the FIG. 12 air bag system.

Referring now to FIG. 13, in addition to FIG. 12, the pressure tank 184 is deep drawn in one piece from 1018 mild sheet steel. The pressure tank 184 has a neck 194 which is hot turned and threaded onto the manifold 186. By way of example, the volume of the pressure tank 184 is approximately 8.5 cubic inches, and the storage pressure is 2500 psi. Any suitable gas may be employed, preferably an inert gas. The preferred inert gas is helium, but other suitable inert gases may usefully be employed, such as argon, nitrogen and mixtures of helium and argon. For purposes of comparison, the inflated volume of the air bag 178 is 0.82 cubic feet. It will be appreciated that employing a tank 184 of known volume storing gas under known pressure results in a controllable and predictable volume of gas for inflating the air bag 178, avoiding the need for a dynamic air bag.

Preferably located in the neck 194 of the pressure tank 184 are a pair of frangible membranes 196 and 198, arranged in series for sealing the gas under pressure within the tank 184. The thickness of the disk is 0.005 inches, and the preferred diameter is 0.5 inches. Suitable disks are manufactured by Continental Disks of Liberty, Mo.

Positioned between the frangible disks 196 and 198 is a controllable device 200 for rupturing the frangible membranes 196 and 198, preferably a pyrotechnic device, which may also be termed a squib, such as a Model No. M100, produced by Dyno Nobel, of Mt. Ewing, N.Y.

While in principle a single one of the frangible membranes 196 and 198 is sufficient, having the two frangible membranes 196 and 198 allows the pyrotechnic device 200 to be positioned therebetween and rendered essentially inaccessible to prevent tampering.

The frangible membranes 196 and 198 may be welded into the neck 194 of the pressure tank 184 itself, or, alternatively, may be included as part of the manifold 186. In any event, during assembly, the tank 184 and manifold 186 are assembled and sealed together in a hyperbaric chamber at operational pressure. After assembly, the tank 184 and manifold 186 are carefully weighed to ensure proper pressure loading. A high sensitivity helium leak test is performed to verify hermetic integrity.

The pyrotechnic device or squib 200 is precisely aligned and mounted directly in front of the low pressure side of the frangible membrane 196.

The pressure tank 184, frangible membranes 196 and 198, and pyrotechnic squib device 200 are generally of the same types currently employed in various manned as well as unmanned space missions. Such devices are key components of life support, safety and emergency escape systems, and have proven reliability.

Referring finally to FIG. 14, shown is an electrical schematic diagram of an electronics package, preferably included within the shell 12, beneath the seating area. In general, the electronic circuitry of FIG. 14 monitors the switches described hereinabove, monitors the operational status of the pyrotechnic squib device 200 and the condition of the lithium battery 190 which powers the pyrotechnic squib device 194, and issues a number of voice status and alarm messages described hereinbelow.

The circuit of FIG. 14 includes a logic element in the form of a programmable microcontroller 220, such as a PIC16C55-XT microcontroller manufactured by Microchip Devices. In overview, the microcontroller 220 monitors the status of the various switches described hereinabove, monitors battery voltages, and serves as the controlling element of a voice message synthesizer, generally designated 222.

Power for the microcontroller 220 and the voice synthesizer 222 is supplied by a 9-volt battery 224 connected to the input of a 5-volt voltage regulator 226, the output of which supplies operating voltage $V_{DD}$ for the microcontroller 220 and, additionally, through a power conserving switching circuit 228, supplies operating voltage $V_{CC}$ for the voice synthesizer 222, as well as operating voltage for various comparators.

Inputs to the microcontroller 220 include an input from the buttocks switch 46, inputs from the two seat belt sensing switches 52 and 52', and an input from one pole 150A of the harness switch 150. These inputs are supplied along respective input lines 230, 232, 234 and 236, to which pull up resistors (not shown) are also connected, as is conventional.

Power for the pyrotechnic squib device 200 is supplied from the lithium battery 190, through a second pole 150B of the harness switch 150 which, when activated, in effect arms the squib 200.

The primary intended switch for supplying power from the battery 190 to the squib 200 for deploying the air bag 178 (assuming the system 170 is armed) is the accelerometer 192. However, to discourage tampering by deploying the air bag 178 rendering a tampered-with system unsuitable for use, the anti-tampering switch 180 is connected electrically in parallel with the accelerometer switch 192.

For monitoring the squib 200, a resistor 240, for example 10K ohms, is connected to the 5-volt $V_{CC}$ supply, in series with the squib 200 in a voltage divider configuration. A comparator 242 has its non-inverting (+) input connected to sense the voltage across the squib device 200. For reference purposes, connected to the inverting (−) input of the comparator 242 is the tap point of a voltage divider comprising resistors 244 and 246. Under normal conditions, the squib 200 has a voltage drop of approximately 10 to 20 millivolts across its terminals. If the squib 200 were to open circuit, then a voltage of approximately 5 volts is developed across the terminals of the squib 200 and appears at the non-inverting (+) input of the comparator 222, causing the output to go high, to be sensed by an input of the microcontroller 220 along line 248.

A pair of battery voltage monitoring circuits 250 and 252 are provided, for respectively monitoring the voltage supplied by the battery 190 for the squib 200 circuit, and the 9-volt battery 224 for the rest of the electronics. The battery 190 for the squib 200 is a permanent, non-replaceable part of the child safety and restraint system, and is expected to last the life of the system.

The 9-volt battery 224, on the other hand, is user-replaceable. It will be appreciated that, even in the event the battery 224 is completely dead, the air bag can still be armed and deployed under power from the lithium battery 190; the various warning functions, however, would not be active.

In any event, the two battery monitoring circuits 250 and 252 include respective comparators 254 and 256 having their inverting (−) inputs connected to suitable reference voltage dividers 258 and 260. The lithium battery 190 is connected directly to the non-inverting (+) input of the comparator 254, and the 9-volt battery 224 is connected to the non-inverting (+) input of the comparator 256 through a voltage divider 262. The various resistor values are selected such that the outputs of the respective comparators 254 and 256 go low when the corresponding battery voltage is low, and the signals are conveyed to inputs of the microcontroller 220 along lines 264 and 266.

For power conservation purposes, the power switching circuit 228 more particularly comprises a P-channel FET transistor having its gate terminal 282 connected to an output 284 of the microcontroller 220, its source terminal 286 connected to the output of the 5-volt voltage regulator 226, and having its drain terminal 288 connected to supply the $V_{CC}$ supply voltage. A resistor 290, having a typical resistance of 100 ohms, is connected between the transistor gate 282 and drain 288 terminals. A suitable capacitor 292 or several capacitors in parallel provides bypassing and power supply decoupling. The microcontroller 220 thus selectively enables the supplying of $V_{CC}$ supply voltage to other portions of the circuit.

The voice synthesizer 222, in addition to the microcontroller 220, comprises an EPROM memory 300 addressed by the microcontroller 220 along a suitable bus 302, including conventional interface circuits (not shown) such as an address latch. Various voice messages are digitally recorded in the EPROM 300. The output of the EPROM 300 is connected to the input of a digital-to-analog converter 302, the output of which drives a suitable audio amplifier 304, which in turn drives a speaker 306. The amplifier 304 provides approximately ½ watt of audio power to ensure the audio is loud enough to be heard over typical noises generated within a vehicle.

Using a 64K byte EPROM 300, a total of eleven seconds of high quality audio can be stored, at a sampling frequency of 6 kHz.

Although not illustrated, for prolonging life of the battery 224, it will be appreciated that various power saving techniques can be employed, such as a watch dog timer (not shown) whereby the microcontroller 220 may remain in "sleep mode" most of the time, with the watch dog timer circuit "waking up" the microcontroller 220 every 120 milliseconds or so to check the status of the various inputs.

Considering the operation, in brief overview, various messages are played based on the status of various inputs to the microcontroller. More particularly, when the harness switch 150 is activated, the air bag system is armed, and various other messages are enabled. In the event the harness switch 150, the buttocks switch 46 and either seat belt switch 52 or 52' is activated, the message "Child is Safe" is generated. In the event the harness switch 150 is activated, but not the buttocks switch 46, then the message "Child is Escaping" is generated. Although not specifically shown in the drawing figures, a ten-second time delay, for example, may logically be programmed before responding to deactivation of the buttocks switch 46, avoiding a false "child is Escaping" alarm in the event movement of the child results in a momentary opening of the buttocks switch 46. If neither seat belt switch 52 or 52' is activated, then a warning "Adjust Seat Belt" is generated. In addition, if the 9-volt battery 224 (also known as battery No. 2) is low, then the message is generated: "Battery Low, Replace Battery." Finally, if either the lithium battery 190 (also known as battery No. 1) is low, or the squib 200 is open circuited, then a message is generated: "Seat Defective, Return to Factory."

It will be appreciated that the decoding of the various inputs and the addressing of the EPROM memory 300 to output the various messages is readily accomplished by appropriate programming of the microcontroller 220. More particularly, the following Table depicts the programming logic within the microcontroller 220. In the following Table, the event number is simply provided for convenient reference, and the next seven columns represent the status of inputs which result in voice messages. The last five columns indicate which messages are delivered, and how many times, upon the occurrence of particular conditions.

Voice Message Truth Table

| Event Number | Inputs | | | | | | | Outputs | | | | |
|---|---|---|---|---|---|---|---|---|---|---|---|---|
| | HIP | SOK | BS | SB1 | SB2 | B1 | B2 | CIS | CIE | SD | BL | AS |
| 1 | 1 | 0 | 0 | 0 | 0 | 0 | 0 | | | 1 | | |
| 2 | 1 | 0 | 0 | 0 | 0 | 0 | 1 | | | 1 | | |
| 3 | 1 | 0 | 0 | 0 | 0 | 1 | 0 | | 2 | | 3 | 1 |
| 4 | 1 | 0 | 0 | 0 | 0 | 1 | 1 | | 2 | | | 1 |
| 5 | 1 | 0 | 0 | 0 | 1 | 0 | 0 | | | 1 | | |
| 6 | 1 | 0 | 0 | 0 | 1 | 0 | 1 | | | 1 | | |
| 7 | 1 | 0 | 0 | 0 | 1 | 1 | 0 | | 1 | | 2 | |
| 8 | 1 | 0 | 0 | 0 | 1 | 1 | 1 | | 1 | | | |
| 9 | 1 | 0 | 0 | 1 | 0 | 0 | 0 | | | 1 | | |
| 10 | 1 | 0 | 0 | 1 | 0 | 0 | 1 | | | 1 | | |
| 11 | 1 | 0 | 0 | 1 | 0 | 1 | 0 | | 1 | | 2 | |
| 12 | 1 | 0 | 0 | 1 | 0 | 1 | 1 | | 1 | | | |
| 13 | 1 | 0 | 0 | 1 | 1 | 0 | 0 | | | 1 | | |
| 14 | 1 | 0 | 0 | 1 | 1 | 0 | 1 | | | 1 | | |
| 15 | 1 | 0 | 0 | 1 | 1 | 1 | 0 | | 1 | | 2 | |
| 16 | 1 | 0 | 0 | 1 | 1 | 1 | 1 | | 1 | | | |
| 17 | 1 | 0 | 1 | 0 | 0 | 0 | 0 | | | 1 | | |
| 18 | 1 | 0 | 1 | 0 | 0 | 0 | 1 | | | 1 | | |
| 19 | 1 | 0 | 1 | 0 | 0 | 1 | 0 | | | | 2 | 1 |
| 20 | 1 | 0 | 1 | 0 | 0 | 1 | 1 | | | | | 1 |
| 21 | 1 | 0 | 1 | 0 | 1 | 0 | 0 | | | 1 | | |
| 22 | 1 | 0 | 1 | 0 | 1 | 0 | 1 | | | 1 | | |
| 23 | 1 | 0 | 1 | 0 | 1 | 1 | 0 | 1 | | | 2 | |
| 24 | 1 | 0 | 1 | 0 | 1 | 1 | 1 | 1 | | | | |
| 25 | 1 | 0 | 1 | 1 | 0 | 0 | 0 | | | 1 | | |
| 26 | 1 | 0 | 1 | 1 | 0 | 0 | 1 | | | 1 | | |
| 27 | 1 | 0 | 1 | 1 | 0 | 1 | 0 | 1 | | | 2 | |
| 28 | 1 | 0 | 1 | 1 | 0 | 1 | 1 | 1 | | | | |
| 29 | 1 | 0 | 1 | 1 | 1 | 0 | 0 | | | 1 | | |
| 30 | 1 | 0 | 1 | 1 | 1 | 0 | 1 | | | 1 | | |
| 31 | 1 | 0 | 1 | 1 | 1 | 1 | 0 | 1 | | | 2 | |
| 32 | 1 | 0 | 1 | 1 | 1 | 1 | 1 | 1 | | | | |
| 33 | 1 | 1 | 0 | 0 | 0 | 0 | 0 | | | 1 | | |
| 34 | 1 | 1 | 0 | 0 | 0 | 0 | 1 | | | 1 | | |
| 35 | 1 | 1 | 0 | 0 | 0 | 1 | 0 | | | 1 | | |
| 36 | 1 | 1 | 0 | 0 | 0 | 1 | 1 | | | 1 | | |
| 37 | 1 | 1 | 0 | 0 | 1 | 0 | 0 | | | 1 | | |
| 38 | 1 | 1 | 0 | 0 | 1 | 0 | 1 | | | 1 | | |
| 39 | 1 | 1 | 0 | 0 | 1 | 1 | 0 | | | 1 | | |
| 40 | 1 | 1 | 0 | 0 | 1 | 1 | 1 | | | 1 | | |
| 41 | 1 | 1 | 0 | 1 | 0 | 0 | 0 | | | 1 | | |
| 42 | 1 | 1 | 0 | 1 | 0 | 0 | 1 | | | 1 | | |
| 43 | 1 | 1 | 0 | 1 | 0 | 1 | 0 | | | 1 | | |
| 44 | 1 | 1 | 0 | 1 | 0 | 1 | 1 | | | 1 | | |
| 45 | 1 | 1 | 0 | 1 | 1 | 0 | 0 | | | 1 | | |
| 46 | 1 | 1 | 0 | 1 | 1 | 0 | 1 | | | 1 | | |
| 47 | 1 | 1 | 0 | 1 | 1 | 1 | 0 | | | 1 | | |
| 48 | 1 | 1 | 0 | 1 | 1 | 1 | 1 | | | 1 | | |
| 49 | 1 | 1 | 1 | 0 | 0 | 0 | 0 | | | 1 | | |
| 50 | 1 | 1 | 1 | 0 | 0 | 0 | 1 | | | 1 | | |
| 51 | 1 | 1 | 1 | 0 | 0 | 1 | 0 | | | 1 | | |
| 52 | 1 | 1 | 1 | 0 | 0 | 1 | 1 | | | 1 | | |

-continued

Voice Message Truth Table

| Event Number | Inputs | | | | | | | Outputs | | | | |
|---|---|---|---|---|---|---|---|---|---|---|---|---|
| | HIP | SOK | BS | SB1 | SB2 | B1 | B2 | CIS | CIE | SD | BL | AS |
| 53 | 1 | 1 | 1 | 0 | 1 | 0 | 0 | | | | | 1 |
| 54 | 1 | 1 | 1 | 0 | 1 | 0 | 1 | | | | | 1 |
| 55 | 1 | 1 | 1 | 0 | 1 | 1 | 0 | | | | | 1 |
| 56 | 1 | 1 | 1 | 0 | 1 | 1 | 1 | | | | | 1 |
| 57 | 1 | 1 | 1 | 1 | 0 | 0 | 0 | | | | | 1 |
| 58 | 1 | 1 | 1 | 1 | 0 | 0 | 1 | | | | | 1 |
| 59 | 1 | 1 | 1 | 1 | 0 | 1 | 0 | | | | | 1 |
| 60 | 1 | 1 | 1 | 1 | 0 | 1 | 1 | | | | | 1 |
| 61 | 1 | 1 | 1 | 1 | 1 | 0 | 0 | | | | | 1 |
| 62 | 1 | 1 | 1 | 1 | 1 | 0 | 1 | | | | | 1 |
| 63 | 1 | 1 | 1 | 1 | 1 | 1 | 0 | | | | | 1 |
| 64 | 1 | 1 | 1 | 1 | 1 | 1 | 1 | | | | | 1 |

Inputs:
HIP = Harness ("1" = Harness in Place)
SOK = Squib OK ("0" = Squib OK)
BS = Baby Seat ("1" = Satisfied)
SB1 = Seat Belt #1 ("1" = Satisfied)
SB2 = Seat Belt #2 ("1" = Satisfied)
B1 = Battery #1 Low ("0" = Low), Lithium
B2 = Battery #2 Low ("0" = Low), 9 volt
Message Outputs:
CIS = "Child is Safe"
CIE = "Child is Escaping"
SD = "Seat Defective, Return to Factory"
BL = "Battery Low, Replace Battery"
AS = "Adjust Seat Belt"

While the invention has been shown and described herein with reference to specific features, aspects, and embodiments, it will be recognized that numerous variations, modifications, and alternative embodiments exist, and accordingly all such alternative variations, modifications, and other embodiments are to be regarded as being within the spirit and scope of the present invention.

What is claimed is:

1. A child safety and restraint system of a type adapted to be attached in a vehicle to a vehicle seat by fastening of a vehicular seat belt system thereto, said child safety and restraint system comprising:

a seat structure having a harness releasably secured to said seat structure;

a first sensing device mounted to said seat structure, said first sensing device being activated when it senses a presence of a child positioned within said seat structure;

a second sensing device mounted to said seat structure, said second sensing device being activated when it senses that said seat structure is secured to said vehicle seat by locking engagement of said vehicular seat belt system;

a third sensing device mounted to said seat structure, said third sensing device being activated when said harness is secured to said seat structure; and a device for emitting a first audible indication after said first, second, and third sensing devices have been activated.

2. The child safety and restraint system according to claim 1 wherein said first direct indication is a synthesized voice delivering a first message.

3. The child safety and restraint system according to claim 1 further comprising a device for emitting a second direct indication when said first sensing device has been deactivated after first being activated.

4. The child safety and restraint system according to claim 3, wherein said second direct indication is a synthesized voice delivering a second message.

5. The child safety and restraint system according to claim 3 further comprising a device for emitting a third direct indication when said second sensing device has been deactivated after first being activated.

6. The child safety and restraint system according to claim 5 wherein said third direct indication is a synthesized voice delivering a third message.

7. The child safety and restraint system according to claim 1 further comprising a device for emitting a second direct indication that said second sensing device has been deactivated after first being activated.

8. The child safety and restraint system according to claim 7 wherein said second direct indication is a synthesized voice delivering a second message.

9. A child safety and restraint system of a type adapted to be attached in a vehicle to a vehicle seat by fastening of a vehicular seat belt system thereto, said child safety and restraint system comprising:

a seat structure;

a harness mounted to said seat structure, said harness being selectively movable between an open position and a closed position;

a first sensing device mounted to said seat structure, said first sensing device being activated when it senses a presence of a child positioned within said seat structure;

a second sensing device mounted to said seat structure, said second sensing device being activated when it sensed that said seat structure is secured to said vehicle seat by locking engagement of said vehicular seat belt system;

a third sensing device associated with said harness, said third sensing device being actuated when said harness is in said closed position; and a device for emitting a first audible indication after said first, second, and third sensing devices have been actuated.

10. The child safety and restraint system according to claim 9 wherein said first direct indication is a synthesized voice delivering a first message.

11. The child safety and restraint system according to claim 9 further comprising a device for emitting a second direct indication when said first sensing device has been deactivated after first being activated.

12. The child safety and restraint system according to claim 11, wherein said second direct indication is a synthesized voice delivering a second message.

13. The child safety and restraint system according to claim 11 further comprising a device for emitting a third direct indication when said second sensing device has been deactivated after first being activated.

14. The child safety and restraint system according to claim 13 wherein said third direct indication is a synthesized voice delivering a third message.

15. The child safety and restraint system according to claim 9 further comprising a device for emitting a second direct indication that said second sensing device has been deactivated after first being activated.

16. The child safety and restraint system according to claim 15 wherein said second direct indication is a synthesized voice delivering a second message.

17. A child safety and restraint system of a type adapted to be attached in a vehicle to a vehicle seat by fastening of a vehicular seat belt system thereto, said child safety and restraint system comprising:

a seat structure;

a harness mounted to said seat structure, said harness being selectively movable between an open position and a closed position;

a first sensing device mounted to said seat structure, said first sensing device being operable to detect a presence of a child positioned within said seat structure;

a second sensing device mounted to said seat structure, said second sensing device being operable to detect when said seat structure is secured to said vehicle seat by locking engagement of said vehicular seat belt system;

a third sensing device associated with said harness, said third sensing device being operable to detect the position of said harness; and a device for emitting a first audible indication after said first sensing device senses the presence of a child, said second sensing device sensing that said seat structure is secured to said vehicle seat and said third sensing device senses that said harness is in said closed position.

18. The child safety and restraint system according to claim 17 further comprising a device for emitting a second direct indication when said first sensing device detects an absence of said child after first having sensed said presence of said child.

19. The child safety and restraint system according to claim 17 further comprising a device for emitting a second direct indication when said second sensing device detects that said seat structure is not secured to said vehicle after first having sensed that said seat structure was secured to said vehicle.

20. The child safety and restraint system according to claim 17 further comprising a device for emitting a second direct indication when said harness moves from said closed position to said open position.

* * * * *